US008860670B2

United States Patent
Kim et al.

(10) Patent No.: US 8,860,670 B2
(45) Date of Patent: Oct. 14, 2014

(54) APPARATUS AND METHOD FOR PERFORMING SCROLL FUNCTION IN PORTABLE TERMINAL

(75) Inventors: Ji-Young Kim, Suwon-si (KR); Seong-Hoon Kang, Suwon-si (KR); Hye-Soo Lee, Seoul (KR); Sun-Haeng Jo, Busan (KR)

(73) Assignee: Samsung Electronics Co., Ltd (KR)

( * ) Notice: Subject to any disclaimer, the term of this patent is extended or adjusted under 35 U.S.C. 154(b) by 814 days.

(21) Appl. No.: 12/650,159

(22) Filed: Dec. 30, 2009

(65) Prior Publication Data

US 2010/0164895 A1    Jul. 1, 2010

(30) Foreign Application Priority Data

Dec. 31, 2008  (KR) ................. 10-2008-0138015

(51) Int. Cl.
  *G06F 3/041*  (2006.01)
  *G06F 3/0485*  (2013.01)
  *G06F 3/0488*  (2013.01)

(52) U.S. Cl.
  CPC ............ *G06F 3/0488* (2013.01); *G06F 3/0485* (2013.01)
  USPC ......................................... 345/173; 345/178

(58) Field of Classification Search
  CPC .............................. G06F 3/0485; G06F 3/0488
  USPC .......... 345/156–184, 629, 660; 715/201, 234, 715/784, 823, 835, 855; 235/381; 340/572.1
  See application file for complete search history.

(56) References Cited

U.S. PATENT DOCUMENTS

| | | | | |
|---|---|---|---|---|
| 4,808,987 A * | 2/1989 | Takeda et al. | ................. | 345/667 |
| 5,563,996 A * | 10/1996 | Tchao | ............. | 715/201 |
| 5,570,109 A * | 10/1996 | Jenson | ............. | 715/823 |
| 5,590,256 A * | 12/1996 | Tchao et al. | ................. | 715/234 |
| 5,635,953 A * | 6/1997 | Hayami et al. | ................. | 715/855 |
| 5,689,284 A * | 11/1997 | Herget | ............. | 345/661 |
| 5,726,687 A * | 3/1998 | Belfiore et al. | ............... | 715/785 |
| 6,291,051 B1 * | 9/2001 | Shimizu | ............. | 428/131 |
| 6,624,803 B1 * | 9/2003 | Vanderheiden et al. | ...... | 345/156 |
| 6,644,547 B1 * | 11/2003 | White | ............. | 235/381 |
| 6,972,749 B2 * | 12/2005 | Hinckley et al. | ............. | 345/173 |
| 7,692,637 B2 * | 4/2010 | Davis | ............. | 345/173 |
| 7,800,592 B2 * | 9/2010 | Kerr et al. | ............. | 345/173 |
| 7,825,910 B2 * | 11/2010 | Won | ............. | 345/173 |
| 7,934,167 B2 * | 4/2011 | Happonen | ............. | 715/786 |
| 8,111,241 B2 * | 2/2012 | Weinberg et al. | ............. | 345/158 |
| 8,654,082 B2 * | 2/2014 | Borgward | ............. | 345/173 |
| 8,681,112 B2 * | 3/2014 | Singhal | ............. | 345/173 |
| 2006/0238495 A1 * | 10/2006 | Davis | ............. | 345/156 |
| 2006/0258455 A1 * | 11/2006 | Kando | ............. | 463/36 |

(Continued)

FOREIGN PATENT DOCUMENTS

| | | |
|---|---|---|
| JP | 2008-015684 | 1/2008 |
| KR | 1020050021925 | 3/2005 |
| KR | 1020080064311 | 7/2008 |

*Primary Examiner* — Prabodh M Dharia

(74) *Attorney, Agent, or Firm* — The Farrell Law Firm, P.C.

(57) ABSTRACT

An apparatus is provided for performing a scroll function in a portable terminal, in which a touch screen displays a list divided into a plurality of sections, a memory stores a scroll function established for each of the plurality of sections, and a controller locates a focus on a particular item by performing a scroll function established for a particular section, when the section among the plurality of sections is touched and dragged.

19 Claims, 6 Drawing Sheets

(56) References Cited

U.S. PATENT DOCUMENTS

| | | | |
|---|---|---|---|
| 2007/0046646 A1* | 3/2007 | Kwon et al. | 345/173 |
| 2007/0046698 A1* | 3/2007 | Nam et al. | 345/660 |
| 2007/0291013 A1* | 12/2007 | Won | 345/173 |
| 2008/0046836 A1* | 2/2008 | Maruyama et al. | 715/784 |
| 2008/0055087 A1* | 3/2008 | Horii et al. | 340/572.1 |
| 2008/0165150 A1* | 7/2008 | Kwon | 345/173 |
| 2008/0174567 A1* | 7/2008 | Woolley et al. | 345/173 |
| 2008/0205681 A1* | 8/2008 | Norberg et al. | 381/334 |
| 2008/0255782 A1* | 10/2008 | Bilac et al. | 702/62 |
| 2008/0297536 A1* | 12/2008 | Matsuno et al. | 345/684 |
| 2009/0037840 A1* | 2/2009 | Chen | 715/784 |
| 2009/0075694 A1* | 3/2009 | Kim et al. | 455/556.1 |
| 2009/0109243 A1* | 4/2009 | Kraft et al. | 345/660 |
| 2009/0144661 A1* | 6/2009 | Nakajima et al. | 715/835 |
| 2009/0158214 A1* | 6/2009 | Arnold et al. | 715/830 |
| 2009/0158222 A1* | 6/2009 | Kerr et al. | 715/867 |
| 2009/0262072 A1* | 10/2009 | Chen | 345/157 |
| 2009/0288889 A1* | 11/2009 | Carlvik et al. | 178/18.03 |
| 2010/0008031 A1* | 1/2010 | Reifman et al. | 361/679.3 |
| 2010/0087228 A1* | 4/2010 | Griffin et al. | 455/566 |
| 2010/0121693 A1* | 5/2010 | Pacana | 705/14.4 |
| 2010/0207908 A1* | 8/2010 | Hinckley et al. | 345/174 |
| 2010/0214234 A1* | 8/2010 | Singhal | 345/173 |
| 2011/0145756 A1 | 6/2011 | Hama et al. | |
| 2011/0261030 A1* | 10/2011 | Bullock | 345/204 |
| 2012/0056839 A1* | 3/2012 | Rosenberg et al. | 345/173 |

* cited by examiner

APPARATUS AND METHOD FOR PERFORMING SCROLL FUNCTION IN PORTABLE TERMINAL

PRIORITY

This application claims priority under 35 U.S.C. §119(a) to a Korean Patent Application filed in the Korean Intellectual Property Office on Dec. 31, 2008 and assigned Serial No. 10-2008-0138015, the contents of which are incorporated herein by reference.

BACKGROUND OF THE INVENTION

1. Field of the Invention

The present invention relates generally to an apparatus and method for performing a scroll function in a portable terminal, and more particularly, to an apparatus and method for performing a convenient and correct scroll function in a portable terminal.

2. Description of the Related Art

Referring to FIG. 1A, a conventional list displayed on a touch screen of a portable terminal is illustrated.

There are various methods for determining a scrolling amount of list items in a conventional portable terminal with a touch screen as shown in FIG. 1A. A first method determines a scrolling amount and speed depending on a drag distance and a speed at which a user carries out a touch and the drag. A second method provides a slide bar 101 in a partial region of a list and determines a scrolling amount according to how a user touches and drags the slide bar 101.

However, in these conventional list item scrolling methods, the user may not correctly input a desired scrolling amount when performing scrolling. In the method for determining a scrolling amount based on a touch-and-drag speed and/or a drag distance, the user may not accurately input the drag speed and distance corresponding to a desired scrolling amount.

Therefore, the user may repeatedly input the incorrect scrolling amount until a focus shifts to a desired position or a desired item appears, which causes frequent occurrence of the repeated touch input.

FIG. 1B illustrates a spin list displayed on a touch screen of a conventional portable terminal. As shown in FIG. 1B, a date can be changed in the spin list by performing a touch and drag. However, when the touch and drag is performed to change a date, the scrolling amount varies according to the drag distance, compelling the user to inconveniently repeat the touch and drag in order to input a correct date.

SUMMARY OF THE INVENTION

An aspect of the present invention is to address at least the above-mentioned problems and/or disadvantages and to provide at least the advantages described below. Accordingly, an aspect of the present invention provides an apparatus and method for performing a convenient and correct scroll function in a portable terminal.

According to the present invention, there is provided an apparatus for performing a scroll function in a portable terminal, in which a touch screen displays a list divided into a plurality of sections, a memory stores a scroll function established for each of the plurality of sections, and a controller locates a focus on a particular item by performing a scroll function established for a particular section, when the section among the plurality of sections is touched and dragged.

According to the present invention, there is provided a method for performing a scroll function in a portable terminal, in which a list divided into a plurality of sections is displayed, a section where a touch and drag has occurred is extracted from among the plurality of sections, if the touch and drag has occurred in the list, and a focus is located on a particular item by performing a scroll function established for the extracted section.

BRIEF DESCRIPTION OF THE DRAWINGS

The above and other aspects, features and advantages of embodiments of the present invention will be more apparent from the following description taken in conjunction with the accompanying drawings, in which.

DETAILED DESCRIPTION OF THE EMBODIMENTS

Figure 1A:
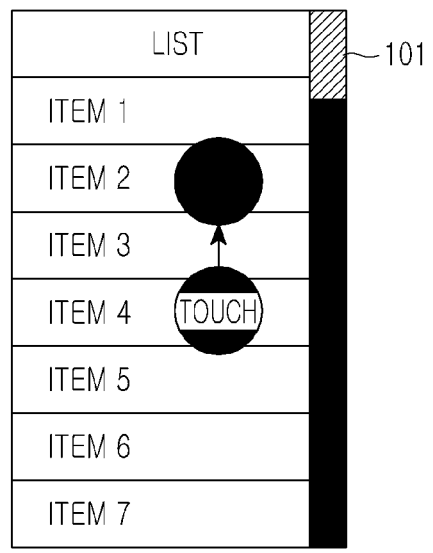
FIG. 1A illustrates a conventional list displayed on a touch screen of a portable terminal.
Figure 1B:
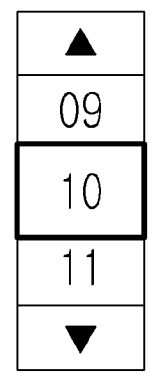
FIG. 1B illustrates a conventional spin list displayed on a touch screen of a portable terminal.

Embodiments of the present invention are described in detail with reference to the accompanying drawings. The same or similar components may be designated by the same or similar reference numerals although they are illustrated in different drawings. Detailed descriptions of constructions or processes known in the art may be omitted for the sake of clarity and conciseness.

Figure 2:
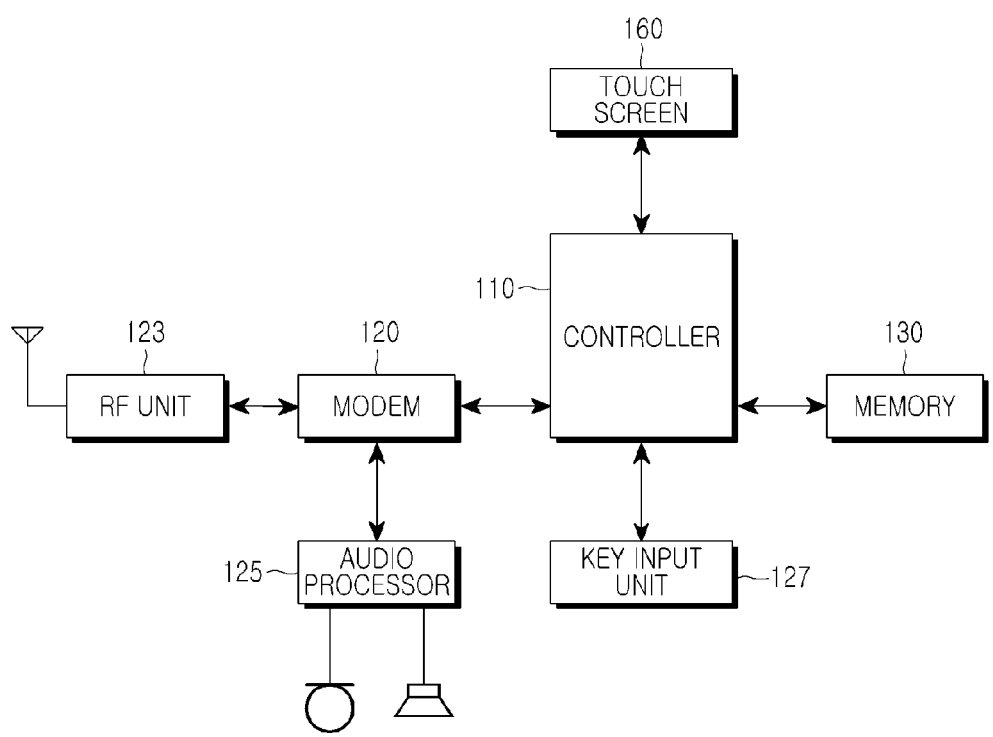
FIG. 2 illustrates a portable terminal with a touch screen according to the present invention.

FIG. 2 illustrates a portable terminal with a touch screen according to the present invention. Referring to FIG. 2, a Radio Frequency (RF) unit 123 performs a radio communication function of a portable terminal. The RF unit 123 includes an RF transmitter for up-converting a frequency of a transmission signal and amplifying the up-converted signal, and an RF receiver for low-noise-amplifying a received signal and down-converting a frequency of the low-noise-amplified signal. A modem 120 includes a transmitter for encoding and modulating the transmission signal, and a receiver for demodulating and decoding the received signal. An audio processor 125 may include a codec (not shown), which consists of a data codec for processing packet data and an audio codec for processing an audio signal such as voice. The audio processor 125 converts a digital audio signal received from the modem 120 into an analog signal by means of the audio codec and plays the analog signal, or converts an analog audio transmission signal picked up by a microphone into a digital audio signal by means of the audio codec and transfers the digital audio signal to the modem 120. The codec may be provided separately, or included in a controller 110.

A memory 130 may include a program memory and a data memory. The program memory may store programs for controlling a general operation of the portable terminal, and programs for controlling a scroll function established for each of a plurality of sections that are divided in a list. The data memory temporarily stores data generated while the programs are executed.

The memory 130 stores scroll functions established for a plurality of sections divided in a list, and the scroll function is capable of scrolling items constituting the list in units of a predetermined number of items that is preset to correspond to a scrolling amount and speed. The scroll function may be established for each of the plurality of sections by a user or a developer. Also, the sections may be divided by the user or the developer according to a width of a touch region on the touch screen 160 and/or the number of items constituting the list.

The touch screen 160 displays data output from the controller 110, and the user may input data through a touch by a finger or a stylus pen. A Liquid Crystal Display (LCD) may be used for the touch screen 160. In this case, the touch screen 160 may include an LCD controller, a memory capable of storing video data, and an LCD display device. The LCD realized in a touch-screen fashion may function as an input device.

The touch screen 160 displays the list that is divided into a plurality of sections, and each of the sections is adapted to perform a preset scroll function. A key input unit 127 includes alphanumeric keys for inputting numeric and text information, and function keys for setting various functions. The controller 110 controls the overall operation of the portable terminal, and may include the modem 120 and the codec in the audio processor 125.

According to the present invention, the controller 110 is adapted to display a list on the touch screen 160 such that the list is divided into a plurality of sections for which their associated scroll functions are previously established. Regarding this plurality of sections, the controller 110 scrolls the items constituting the list in units of a predetermined number of items that is preset to correspond to the scrolling amount and speed.

If a particular section among the plurality of sections is touched and dragged, the controller 110 locates a focus on a particular item by performing a scroll function established for the particular section.

If the focus is located on the particular item by performing the scroll function established for the particular section among the plurality of sections, the controller 110 indicates a current location of the particular item where the focus is located among all the items in the list. The current location of the particular item may be indicated by at least one of a bar, a color, and a number.

Figure 3:
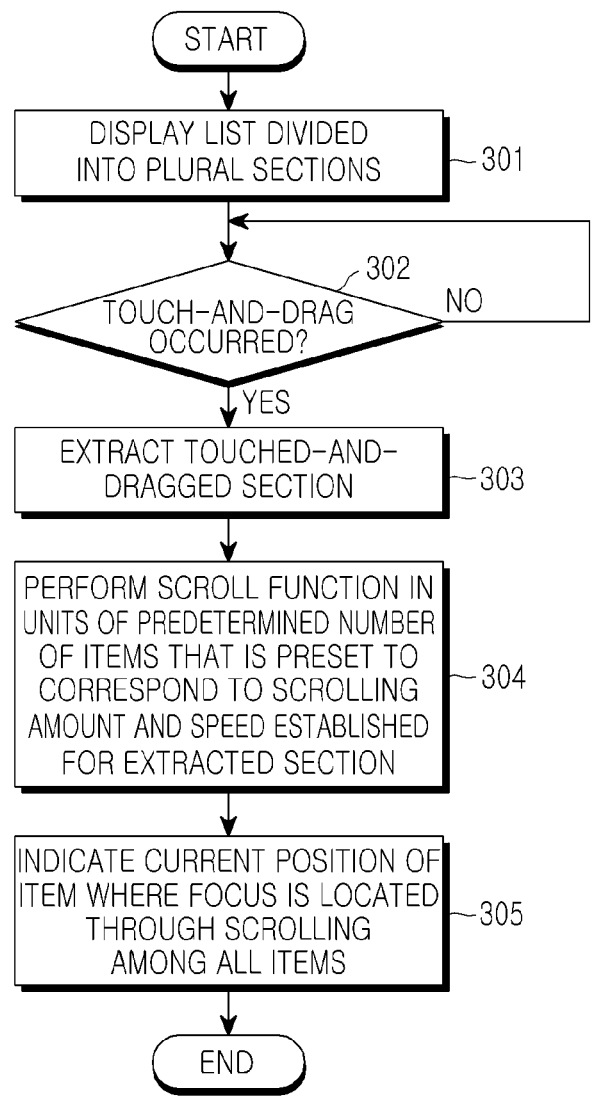
FIG. 3 illustrates a process of performing a scroll function in a portable terminal according to an embodiment of the present invention.

FIG. 3 illustrates process of performing a scroll function in a portable terminal according to the present invention. Referring to FIGS. 2 and 3, the controller 110 displays a list divided into a plurality of sections on the touch screen 160 in step 301. If a touch and drag occurs in step 302, the controller 110 extracts or detects a section where the touch and drag has occurred in step 303. After extracting the touched and dragged section in step 303, the controller 110 proceeds to step 304 where it locates a focus on a particular item by performing a scroll function in units of a predetermined number of items that is preset to correspond to a scrolling amount and speed in the section.

The touch screen 160 may display the list such that the user can be aware of the preset scrolling units so as to perform an associated scroll function in each of the plurality of sections. The sections displayed on the list may also be preset by the developer or the user according to a width of the touch region on the touch screen 160 and/or the number of items constituting the list.

Steps 301 to 304 will be described by way of example with reference to FIGS. 4 to 6, and step 305 will be described later herein.

Figure 4C:
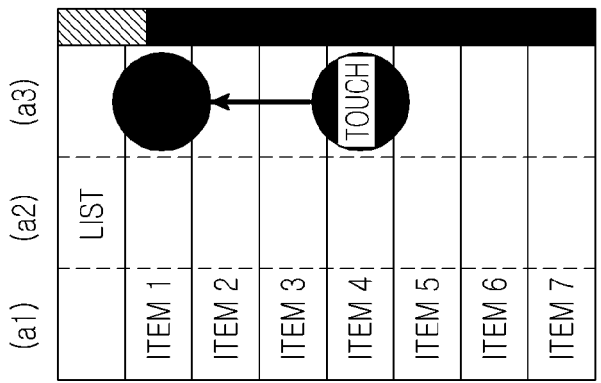
FIGS. 4A to 4C illustrate scroll operations in a portable terminal according to a first embodiment of the present invention.
Figure 4B:
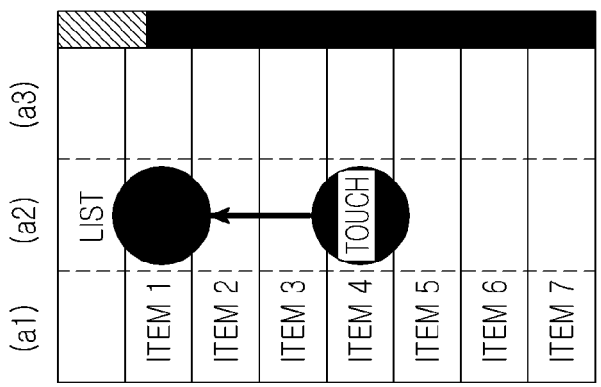
Figure 4A:
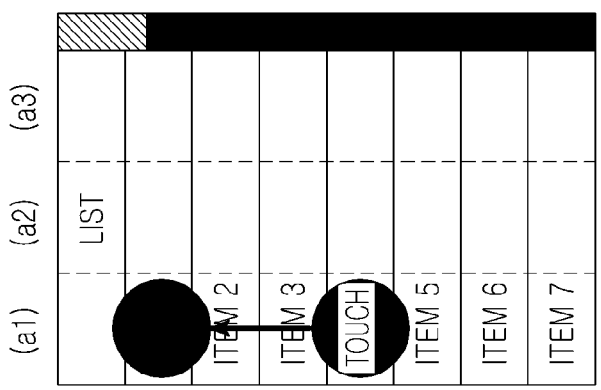

In FIGS. 4A to 4C, a list has a plurality of items and is divided into three sections a1, a2 and a3, which are predefined by the developer or the user such that section a1 is set to perform a scroll function in units of one page consisting of 7 items, section a2 to perform a scroll function in units of a half page consisting of 4 items (a rounding off of 3.5 items), and section a3 to perform a scroll function on an item-by-item basis.

As shown in FIG. 4A, if a touch and drag occurs in the section a1 by the user, one page (with 7 items), which is a scrolling unit that is preset to correspond to a scrolling amount and speed in this section, is scrolled regardless of the touch point or the dragging speed and distance. As shown in FIG. 4B, if a touch and drag occurs in the section a2 by the user, a half page (with 4 items) is scrolled, which is a scrolling unit that is preset to correspond to a scrolling amount and speed in this section. As shown in FIG. 4C, if a touch and drag occurs in the section a3 by the user, one item is scrolled, which is a scrolling unit that is preset to correspond to a scrolling amount and speed in this section.

Figure 5A:
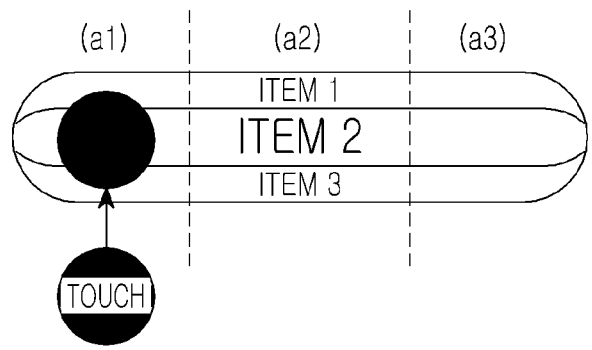
FIGS. 5A to 5C illustrate scroll operations in a portable terminal according to a second embodiment of the present invention.
Figure 5B:
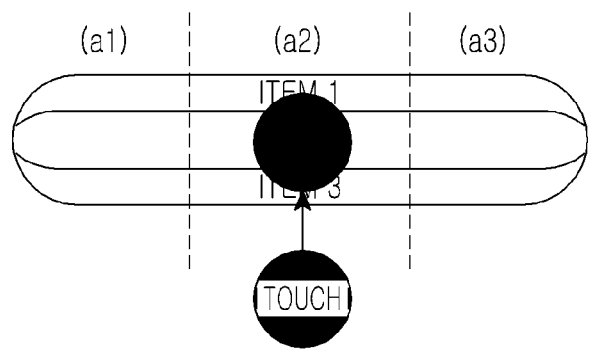
Figure 5C:
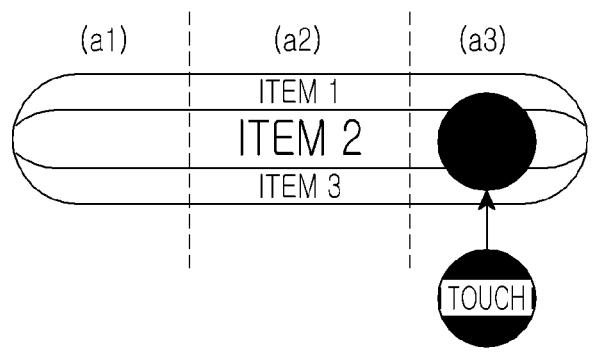

FIGS. 5A to 5C illustrate scroll operations in a portable terminal according to a second embodiment of the present invention. In FIGS. 5A to 5C, a spin list has 3 items shown in one page, and is divided into sections a1, a2 and a3, which are predefined by the developer or the user such that section a1 is set to perform a scroll function in units of two pages, section a2 to perform a scroll function on a page-by-page basis, and section a3 to perform a scroll function on an item-by-item basis.

As shown in FIG. 5A, if a touch and drag occurs in section a1 by the user, two pages (with 6 items), which are a scrolling unit that is preset to correspond to a scrolling amount and speed in this section, are scrolled regardless of the touch point and the dragging speed and distance. As shown in FIG. 5B, if a touch and drag occurs in section a2 by the user, one page (with 3 items) is scrolled, which is a scrolling unit that is preset to correspond to a scrolling amount and speed in this section. As shown in FIG. 5C, if a touch and drag occurs in section a3 by the user, one item is scrolled, and is a scrolling unit that is preset to correspond to a scrolling amount and speed in this section.

Figure 6:
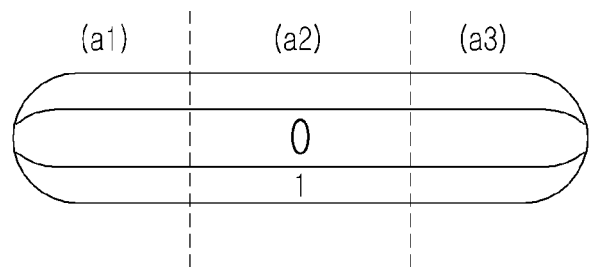
FIG. 6 illustrates a scroll operation in a portable terminal according to a third embodiment of the present invention.

FIG. 6 illustrates a scroll operation in a portable terminal according to a third embodiment of the present invention. In FIG. 6, a spin list for inputting a date is divided into three sections a1, a2 and a3, which are predefined by the developer or the user such that section a1 is set to perform a scroll function in units of 10 items, section a2 to perform a scroll function in units of 5 items, and section a3 to perform a scroll function on an item-by-item basis.

Accordingly, if a touch and drag occurs in section a1 by the user, 10 items are scrolled and are preset to correspond to a scrolling amount and speed in this section, regardless of the touch point and the dragging speed and distance. If a touch and drag occurs in section a2 by the user, 5 items are scrolled and are a scrolling unit that is preset to correspond to a scrolling amount and speed in this section. If a touch and drag occurs in section a3 by the user, a scroll function is performed on an item-by-item basis, and is a scrolling unit that is preset to correspond to a scrolling amount and speed in this section.

In FIG. 6, in order to input "25" in the position of the current item, the user may perform a touch and drag in section a1 twice and then perform one particular item by performing a scroll function in a particular section in a scrolling unit that is preset to correspond to a scrolling amount and speed in the section, the controller 110 indicates a position of the current item where the focus is located, to inform the user of the position in step 305.

In step 305, the controller 110 indicates a position of a particular item where the focus is located through a scroll function that is established for its associated section, among all items constituting the list. The current location of the item can be distinguishably indicated by at least one of a bar, a color, and a number.

Figure 7:
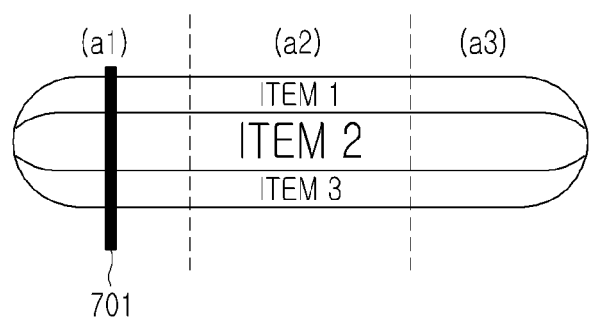
FIG. 7 illustrates a function of indicating a position of a scrolled item in a portable terminal according to a fourth embodiment of the present invention.

FIG. 7 illustrates a function of indicating a position of a scrolled item in a portable terminal according to a fourth embodiment of the present invention. Referring to FIG. 7, a spin list is divided into three sections a1, a2 and a3. If a focus is located on Item 2 through a scroll function established for each of the sections, a position of Item 2 among all items in the spin list (or the full length of the spin list) is indicated by a position of a bar 701, which can be displayed in a distinguishable color.

Figure 8:
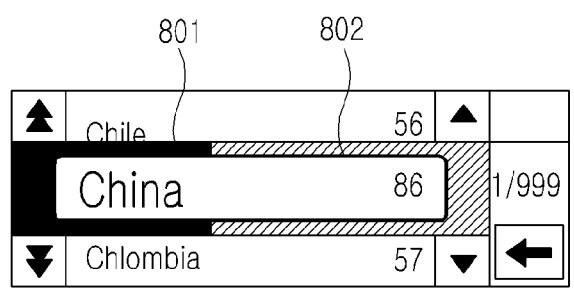
FIG. 8 illustrates a function of indicating a position of a scrolled item in a portable terminal according to a fifth embodiment of the present invention.

FIG. 8 illustrates a function of indicating a position of a scrolled item in a portable terminal according to a fifth embodiment of the present invention. Referring to FIG. 8, a spin list is divided into 3 sections, in which the arrows of different shapes that are located on the left and right indicate different scrolling amounts. An established scroll function can be performed through a touch and drag in its associated section on which any of the arrows is displayed. If a focus is located on an item "China" through the scroll function, the item 802 which is displayed in a particular color in the spin list indicates an entire item and the item 801 which is displayed in another color distinguishable from the color of the entire item 802 indicates a current position of the item "China" among the entire item. In addition, as shown in the right of the spin list, a position of the item "China" may also be indicated by a number.

As shown in FIG. 8, when a list where countries are searched and displayed have the same first syllable as the country the user desires to search for, because the countries are sorted by names, the user may easily find the desired country by performing a scroll function established for the associated section while predicting the scrolling amount.

As is apparent from the foregoing description, by use of the apparatus and method for performing a scroll function in a portable terminal, the user can search for a desired item in the list by performing a scroll function in a more simple and accurate manner with reduced errors. In particular, the user can more quickly search for a desired item in a predicable list, such as available for date setting, time inputting, sorting by name, and sorting by time.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for performing a scroll function in a portable terminal, comprising:
   a touch screen, wherein at least a portion of the touch screen is capable off displaying a list;
   a memory; and
   a controller configured to control the touch screen to display a list on at least a portion of a touch screen, where the at least a portion of the touch screen displaying the list is divided into a plurality of sections, each section having its own function for scrolling through the list and, when input is received indicating a user has touched and dragged in one of the plurality of sections, to locate a focus on a particular item in the list by performing scrolling through the displayed list by an increment or speed corresponding to the one section in which the user touched and dragged, and in a direction corresponding to a direction in which the user dragged.

2. The apparatus of claim 1, wherein the plurality of sections displayed on the at least a portion of the touch screen are divided according to a width of a touch region on the touch screen or a number of items constituting the list.

3. The apparatus of claim 1, wherein the scrolling function established for each of the plurality of sections is performed in units of a preset number of items constituting the list.

4. The apparatus of claim 3, wherein the number of items is preset for each of the plurality of sections based at least on a scrolling amount and speed in a related section.

5. The apparatus of claim 1, wherein the controller controls the touch screen to indicates a current location of the particular item on which the focus is located.

6. The apparatus of claim 5, wherein the current location of the particular item on which the focus is located is indicated in the list by at least one of a bar, a color and a number.

7. A method for performing a scroll function in a portable terminal, comprising:
   displaying a list on at least a portion of a touch screen, where the at least a portion of the touch screen displaying the list is divided into a plurality of sections, each section having its own function for scrolling through the list; and when input is received indicating that a user has touched and dragged in one of the sections from among the plurality of sections comprising the at least a portion of the touch screen displaying, the list
   locating a focus on a particular item in the list by performing scrolling through the displayed list by an increment or speed corresponding to the one section in which the user touched and dragged, and in a direction corresponding to a direction in which the user dragged.

8. The method of claim 7, further comprising:
   indicating a current location of the particular item where the focus is located among all items in the list.

9. The method of claim 8, wherein the current location of the particular item where the focus is located is indicated in the list by at least one of a bar, a color, and a number.

10. The method of claim 7, wherein the plurality of sections displayed on the at least a portion of a touch screen are divided according to a width of a touch region on the touch screen or a number of items constituting the list.

11. The method of claim 7, wherein the scrolling function established for each of the plurality of sections is performed in units of a preset number of items constituting the list.

12. The method of claim 11, wherein the number of items is preset for each of the plurality of sections based at least on a scrolling amount and speed in a related section.

13. A mobile terminal, comprising:
   a touch screen configured to display output and to receive user input; and
   a memory having a program recorded thereon, the program configured for the mobile terminal to perform the steps of:
   displaying a list of items on at least a portion of the touch screen, where the at least a portion of the touch screen display the list of items is divided into a plurality of sections for displaying the list, each section having its own function for scrolling through items of the list; and when input is received indicating that a user has touched and dragged in one of the plurality of sections comprising the at least a portion of the touch screen displaying the list, locating a focus on a particular item in the list by performing scrolling through the displayed list by an increment or speed corresponding to the one section in which the user touched and dragged, and in a direction corresponding to a direction in which the user dragged.

14. The mobile terminal of claim 13, wherein a number of sections into which the at least a portion of the touch screen displaying a list is divided and a scrolling speed for each section is based on at least one of the size of the touch screen and the number of items in the list.

15. The mobile terminal of claim 13, wherein there are a preset number of sections into which the at least a portion of the touch screen displaying a list is divided and a preset scrolling speed for each section.

16. The mobile terminal of claim 13, wherein the program recorded on the memory is further configured for the mobile terminal to perform the step of: selecting a number of sections into which the at least a portion of the touch screen displaying the list is divided and a scrolling speed for each section based on at least one of the size of the touch screen and the number of items in the list.

17. The mobile terminal of claim 13, wherein the program recorded on the memory is further configured for the mobile terminal to perform the step of: receiving input from a user for selecting at least one of a number of sections into which the at least a portion of the touch screen displaying a list is divided and a scrolling speed for each section.

18. The mobile terminal of claim 13, wherein the program recorded on the memory is further configured for the mobile terminal to perform the step of: indicating in the at least a portion of the touch screen displaying the list the particular item on the list that is the focus.

19. The mobile terminal of claim 13, wherein the program recorded on the memory is further configured for the mobile terminal to perform the step of: representing on the touch screen a current location of the particular item within the entire list.

* * * * *